United States Patent
Vakil

(10) Patent No.: US 11,814,498 B2
(45) Date of Patent: Nov. 14, 2023

(54) POLYLACTONE FOAMS AND METHODS OF MAKING THE SAME

(71) Applicant: Novomer, Inc., Rochester, NY (US)

(72) Inventor: Utpal Mahendra Vakil, Evansville, IN (US)

(73) Assignee: Novomer, Inc., Rochester, NY (US)

( * ) Notice: Subject to any disclaimer, the term of this patent is extended or adjusted under 35 U.S.C. 154(b) by 403 days.

(21) Appl. No.: 17/257,984

(22) PCT Filed: Jul. 11, 2019

(86) PCT No.: PCT/US2019/041380
§ 371 (c)(1),
(2) Date: Jan. 5, 2021

(87) PCT Pub. No.: WO2020/014466
PCT Pub. Date: Jan. 16, 2020

(65) Prior Publication Data
US 2021/0324168 A1 Oct. 21, 2021

Related U.S. Application Data

(60) Provisional application No. 62/697,712, filed on Jul. 13, 2018.

(51) Int. Cl.
| | | |
|---|---|---|
| *C08J 9/12* | (2006.01) | |
| *C08J 9/16* | (2006.01) | |
| *C08G 63/08* | (2006.01) | |
| *C08J 9/00* | (2006.01) | |
| *C08J 9/14* | (2006.01) | |
| *C08K 5/00* | (2006.01) | |
| *C08K 5/1515* | (2006.01) | |
| *C08K 5/1525* | (2006.01) | |
| *C08G 101/00* | (2006.01) | |

(52) U.S. Cl.
CPC ............. *C08J 9/122* (2013.01); *C08G 63/08* (2013.01); *C08J 9/0014* (2013.01); *C08J 9/0066* (2013.01); *C08J 9/141* (2013.01); *C08J 9/16* (2013.01); *C08K 5/0016* (2013.01); *C08K 5/0083* (2013.01); *C08K 5/1515* (2013.01); *C08K 5/1525* (2013.01); *C08G 2101/00* (2013.01); *C08J 2201/03* (2013.01); *C08J 2203/06* (2013.01); *C08J 2203/08* (2013.01); *C08J 2203/14* (2013.01); *C08J 2205/052* (2013.01); *C08J 2367/04* (2013.01)

(58) Field of Classification Search
CPC ........ C08J 9/122; C08J 9/0014; C08J 9/0066; C08J 9/141; C08J 9/16; C08J 9/03; C08J 2201/03; C08J 2203/06; C08J 2203/08; C08J 2203/14; C08J 2205/052; C08J 2367/04; C08G 63/08; C08G 2101/00; C08K 5/1515; C08K 5/1525
See application file for complete search history.

(56) References Cited

U.S. PATENT DOCUMENTS

| | | | |
|---|---|---|---|
| 3,188,264 A | 6/1965 | Holden | |
| 3,272,764 A | 9/1966 | Mueller et al. | |
| 3,668,178 A * | 6/1972 | Comstock | ............... C08L 67/06 |
| | | | 525/18 |
| 4,110,269 A | 8/1978 | Ehrenfruend | |
| 4,988,344 A | 1/1991 | Reising et al. | |
| 5,026,589 A | 6/1991 | Schechtman | |
| 5,185,009 A | 2/1993 | Sitnam | |
| 5,350,624 A | 9/1994 | Georger et al. | |
| 5,759,569 A | 6/1998 | Hird et al. | |
| 5,801,224 A | 9/1998 | Narayan et al. | |
| 5,889,140 A | 3/1999 | Watanabe | |
| 6,077,931 A | 6/2000 | Noda | |
| 6,160,199 A | 12/2000 | Noda | |
| 6,258,869 B1 | 7/2001 | Shah et al. | |
| 8,445,703 B2 | 5/2013 | Allen et al. | |
| 8,796,475 B2 | 8/2014 | Allen et al. | |
| 9,096,510 B2 | 8/2015 | Porcelli et al. | |
| 9,156,803 B2 | 10/2015 | Allen et al. | |
| 9,173,780 B2 | 11/2015 | Buell et al. | |
| 9,206,144 B2 | 12/2015 | Allen et al. | |
| 9,327,280 B2 | 5/2016 | Lee et al. | |
| 9,375,358 B2 | 6/2016 | Ehmsperger et al. | |
| 9,375,507 B2 | 6/2016 | Tian et al. | |
| 9,403,788 B2 | 8/2016 | Lee et al. | |

(Continued)

FOREIGN PATENT DOCUMENTS

| | | |
|---|---|---|
| GB | 1479719 A | 7/1977 |
| WO | 2010/118128 A1 | 10/2010 |

(Continued)

OTHER PUBLICATIONS

Gendron, Richard et al., Chapter entitled "Extrusion Foaming of Polylactide." Polymeric Foams: Innovations in Processes, Technologies, and Products. 1st edition, 2016. 53 pages.
Ingeo Foam sheet Extrusion Processing Guide; 11 pages.
International Search Report and Written Opinion for PCT/US2019/041380. dated Nov. 6, 2019. 13 pages.
Kadkin et al., Polyester Polyols: Synthesis and Characterization of Diethylene Glycol Terephthalate Oligomers, Polyester Polyols, 1114-1123; Jan. 2003 (10 pages).

(Continued)

*Primary Examiner* — Irina S Zemel
(74) *Attorney, Agent, or Firm* — Young Basile Hanlon & MacFarlane, P.C.

(57) ABSTRACT

The present invention is directed to compositions comprising polylactone melt, extrudate, and processes for producing a foam. In exemplary embodiments of the present invention, the processes comprise: heating a polylactone composition containing a biobased polylactone in a reaction vessel; and subjecting the polylactone composition to molding to give a foamed structure.

20 Claims, No Drawings

(56) References Cited

U.S. PATENT DOCUMENTS

| | | | |
|---|---|---|---|
| 9,440,220 B2 | 9/2016 | Naumann et al. |
| 9,445,951 B2 | 9/2016 | Moberg-Alehammar et al. |
| 9,474,657 B2 | 10/2016 | Berrizbeitia et al. |
| 9,480,968 B2 | 11/2016 | Weismantel et al. |
| 9,493,391 B2 | 11/2016 | Allen et al. |
| 9,738,784 B2 | 8/2017 | Allen et al. |
| 9,914,689 B2 | 3/2018 | Porcelli et al. |
| 10,065,914 B1 | 9/2018 | Ruhl et al. |
| 10,099,988 B2 | 10/2018 | Farmer et al. |
| 10,099,989 B2 | 10/2018 | Sookraj |
| 10,144,802 B2 | 12/2018 | Sookraj |
| 10,221,150 B2 | 3/2019 | Farmer et al. |
| 10,221,278 B2 | 3/2019 | Lee et al. |
| 10,245,559 B2 | 4/2019 | Lapointe et al. |
| 10,500,104 B2 | 12/2019 | Sookraj |
| 2004/0030283 A1 | 2/2004 | Brooks |
| 2004/0078015 A1 | 4/2004 | Copat et al. |
| 2005/0032923 A1 | 2/2005 | Oka et al. |
| 2009/0093550 A1 | 4/2009 | Rolfes et al. |
| 2009/0234035 A1 | 9/2009 | Cheung et al. |
| 2010/0003517 A1 | 1/2010 | Hansson |
| 2011/0015602 A1 | 1/2011 | Schmidt et al. |
| 2011/0166245 A1 | 7/2011 | Kunihiro et al. |
| 2011/0275727 A1 | 11/2011 | Yamamoto et al. |
| 2011/0319849 A1 | 12/2011 | Collias et al. |
| 2012/0009420 A1 | 1/2012 | Pawloski et al. |
| 2012/0107366 A1 | 5/2012 | Kapiamba |
| 2012/0123137 A1 | 5/2012 | Allen et al. |
| 2012/0157950 A1 | 6/2012 | Geilich et al. |
| 2013/0165670 A1 | 6/2013 | Allen et al. |
| 2013/0209775 A1 | 8/2013 | Allen et al. |
| 2013/0266767 A1 | 10/2013 | Chung et al. |
| 2013/0281715 A1 | 10/2013 | Allen et al. |
| 2014/0275575 A1 | 9/2014 | Allen et al. |
| 2014/0296522 A1 | 10/2014 | Lee et al. |
| 2014/0309399 A1 | 10/2014 | Porcelli et al. |
| 2015/0005513 A1 | 1/2015 | Lee et al. |
| 2015/0141693 A1 | 5/2015 | Allen et al. |
| 2015/0299083 A1 | 10/2015 | Porcelli et al. |
| 2015/0320901 A1 | 11/2015 | Chandrashekhar-Bhat et al. |
| 2015/0342799 A1 | 12/2015 | Michiels et al. |
| 2015/0368394 A1 | 12/2015 | Allen |
| 2016/0016876 A1 | 1/2016 | Mahoney |
| 2016/0102040 A1 | 4/2016 | Allen et al. |
| 2016/0102068 A1 | 4/2016 | Allen et al. |
| 2016/0208062 A1 | 7/2016 | Katayama et al. |
| 2016/0288057 A1 | 10/2016 | Lapointe et al. |
| 2017/0029352 A1 | 2/2017 | Sookraj et al. |
| 2017/0073463 A1 | 3/2017 | Lee et al. |
| 2017/0080409 A1 | 3/2017 | Farmer et al. |
| 2017/0096407 A1 | 4/2017 | Sookraj |
| 2017/0100861 A1 | 4/2017 | Pawloski et al. |
| 2017/0107103 A1 | 4/2017 | Sookraj et al. |
| 2017/0145126 A1 | 5/2017 | Mahoney |
| 2017/0224540 A1 | 8/2017 | Li et al. |
| 2017/0225157 A1 | 8/2017 | Lee |
| 2017/0247309 A1 | 8/2017 | Porcelli et al. |
| 2017/0267618 A1 | 9/2017 | Sookraj et al. |
| 2018/0016219 A1 | 1/2018 | Farmer et al. |
| 2018/0022677 A1 | 1/2018 | Sookraj |
| 2018/0028725 A1 | 2/2018 | Tooren et al. |
| 2018/0029005 A1 | 2/2018 | Sookraj |
| 2018/0030014 A1 | 2/2018 | Sookraj et al. |
| 2018/0030015 A1 | 2/2018 | Farmer et al. |
| 2018/0030201 A1 | 2/2018 | Farmer et al. |
| 2018/0057619 A1 | 3/2018 | Sookraj |
| 2018/0094100 A1 | 4/2018 | Farmer et al. |
| 2018/0153746 A1 | 6/2018 | Sookraj |
| 2018/0155490 A1 | 6/2018 | Sookraj |
| 2018/0155491 A1 | 6/2018 | Sookraj |
| 2018/0162093 A1 | 6/2018 | Sasaki |
| 2018/0282251 A1 | 10/2018 | Sookraj |
| 2018/0305286 A1 | 10/2018 | Sookraj |
| 2018/0305289 A1 | 10/2018 | Sookraj et al. |
| 2018/0354881 A1 | 12/2018 | Farmer et al. |
| 2018/0354882 A1 | 12/2018 | Sookraj |
| 2019/0002385 A1 | 1/2019 | Sookraj et al. |
| 2019/0030520 A1 | 1/2019 | Lee |
| 2019/0031592 A1 | 1/2019 | Sookraj et al. |
| 2019/0047972 A1 | 2/2019 | Sookraj |
| 2019/0071538 A1 | 3/2019 | Sookraj |
| 2019/0076834 A1 | 3/2019 | Sookraj |
| 2019/0076835 A1 | 3/2019 | Sookraj |
| 2019/0106532 A1 | 4/2019 | Sookraj |

FOREIGN PATENT DOCUMENTS

| | | |
|---|---|---|
| WO | 2012/030619 A1 | 3/2012 |
| WO | 2012/051219 A2 | 4/2012 |
| WO | 12065745 A1 | 5/2012 |
| WO | 2012/158573 A1 | 11/2012 |
| WO | 2013/063191 A1 | 5/2013 |
| WO | 2013/122905 A1 | 8/2013 |
| WO | 2013/126375 A1 | 8/2013 |
| WO | 2014/004858 A1 | 1/2014 |
| WO | 2014/008232 A2 | 1/2014 |
| WO | 2015/085295 A2 | 6/2015 |
| WO | 2015/138975 A1 | 9/2015 |
| WO | 2015/171372 A1 | 11/2015 |
| WO | 2015/184289 A1 | 12/2015 |
| WO | 2016/015019 A1 | 1/2016 |
| WO | 2016/023016 A1 | 2/2016 |
| WO | 2016/130947 A1 | 8/2016 |
| WO | 2016/130977 A1 | 8/2016 |
| WO | 2016/130988 A1 | 8/2016 |
| WO | 2016/130993 A1 | 8/2016 |
| WO | 2016/130998 A1 | 8/2016 |
| WO | 2016/131001 A1 | 8/2016 |
| WO | 2016/131003 A1 | 8/2016 |
| WO | 2016/131004 A1 | 8/2016 |
| WO | 2017/023777 A1 | 2/2017 |
| WO | 2017/023820 A1 | 2/2017 |
| WO | 2017/165323 A1 | 9/2017 |
| WO | 2017/165344 A1 | 9/2017 |
| WO | 2017/165345 A1 | 9/2017 |
| WO | 2018/085251 A1 | 5/2018 |
| WO | 2018/085254 A1 | 5/2018 |
| WO | 2018/106824 A1 | 6/2018 |
| WO | 2018/107185 A1 | 6/2018 |
| WO | 2018/136638 A1 | 7/2018 |
| WO | 2018/144998 A1 | 8/2018 |
| WO | 2018/170006 A1 | 9/2018 |
| WO | 2018/200466 A1 | 11/2018 |
| WO | 2018/200471 A1 | 11/2018 |
| WO | 2019/006366 A1 | 1/2019 |
| WO | 2019/006377 A1 | 1/2019 |
| WO | 2019/050649 A1 | 3/2019 |
| WO | 2019/051184 A1 | 3/2019 |
| WO | 2019/070981 A1 | 4/2019 |
| WO | 2020014466 A1 | 1/2020 |

OTHER PUBLICATIONS

Productivity and efficiency in foam extrusion XE Schaumex@ and Schaumtandex lines. KraussMaffei catalog. 24 pages.

Supplementary European Search Report in co-pending application EP 19 83 4185 dated Jan. 24, 2022 (8 pages).

Reignier, Joel et al., "Autoclave Foaming of Poly(e-caprolactone) Using Carbon Dioxide: Impace of Crystallization on Cell Structure." NRC Publications Archive. Article in Journal of Cellular Plastics—Nov. 2007 (43 pages).

\* cited by examiner

POLYLACTONE FOAMS AND METHODS OF MAKING THE SAME

CROSS-REFERENCE TO RELATED APPLICATIONS

This application is a National Stage Filing under 35 U.S.C. § 371 of the PCT Application No. PCT/US2019/041380 filed 11 Jul. 2019, published as WO2020/014466, which claims priority from U.S. Provisional Application No. 62/697,712 filed 13 Jul. 2018, both of which are incorporated herein by reference in their entirety for all purposes.

FIELD

This invention generally relates to compositions and processes for producing polymer foams. More specifically, the present invention is directed to polylactone-based foam compositions and methods for producing the same. Advantageously, the compositions and processes are useful for the production of a variety of biobased products.

BACKGROUND

Polymeric foams made up of polymer chains dispersed by a gas form voids, also known as cells, between the polymer chains. By replacing solid plastic with voids, polymeric foams use fewer raw materials than solid plastics for a given volume. Thus, by using polymeric foams instead of solid plastics, material costs can be reduced in many applications. Additionally, foams are useful in applications as insulators and/or sealants.

Polylactones, such as polypropiolactone, polylactide, polyglycolide, and polycaprolactone, are generally biodegradable aliphatic polyesters which may be made up of biobased monomers. The polylactones are generally stable, have low toxicity, and may be easily transported and stored at remote locations. Recent advances in the carbonylation of epoxides (see, e.g., U.S. Pat. No. 6,852,865) and the ring-opening polymerization of beta-propiolactone intermediates have provided more efficient and versatile synthetic routes to polylactones. These recent advances in production combined with beneficial physical and chemical properties make polylactones ideal for many commercial and industrial applications.

Currently, polymer foams are commonly made using a continuous process where a blowing agent and a molten resin are extruded under pressure through an appropriate die into a lower pressure atmosphere. See US 2012/0009420. Alternatively, in a batch or staged process, components such as a polymer and a blowing agent are expanded to a foam by heating to a temperature near or above a glass-transition or crystal-melt temperature. The blowing agents more commonly used for making thermoplastic polymer foams are hydrocarbons, chlorinated hydrocarbons, hydrochlorofluorocarbons, hydrofluorocarbons, or combinations thereof.

Therefore, a need exists not only to make foams which minimize the accumulation of solid waste, but also to produce biobased and/or compostable foams using alternative methods are that are commercially viable and efficient.

BRIEF SUMMARY

The present invention solves these needs by providing polylactone-based foams and processes for production. Preferred embodiments are directed to polylactone foams comprising at least one polylactone polymer. In certain preferred embodiments, the polylactone polymer comprises at least one beta-lactone monomer. In certain preferred embodiments, the polylactone polymer comprises two or more beta-lactone monomers. In certain embodiments, at least one beta-lactone monomer is beta-propiolactone. In certain preferred embodiments, at least one polylactone polymer is polypropiolactone.

In preferred embodiments, provided are processes for producing a polylactone-based foam. In certain preferred embodiments, the processes comprise: polymerizing at least one beta-lactone monomer to produce at least one polylactone; and blowing at least one polylactone to produce the polylactone-based foam. In certain preferred embodiments, the processes comprise: carbonylating an epoxide with carbon monoxide to produce at least one beta-lactone monomer; polymerizing at least one beta-lactone monomer to produce at least one polylactone; and blowing at least one polylactone to produce the polylactone-based foam. In certain embodiments, the epoxide and/or carbon monoxide are biobased.

In some embodiments, the process for producing a foam may include heating components comprising at least one polylactone. The process for producing a foam may be further carried out by subjecting the heated polylactone composition to molding to give a foamed structure. In some variations, the composition comprising the at least one polylactone is in the form of a resin.

Optionally, in some embodiments, the polylactone may have greater than about 60% by weight, greater than about 70% by weight, greater than about 80% by weight, greater than about 90% by weight, greater than about 95% by weight, or greater than about 99% by weight biobased content, for example.

Optionally, in some embodiments, the polylactone is a polypropiolactone or an end-capped polypropiolactone. In some embodiments, the polypropiolactone or end-capped polypropiolactone has a molecular weight of between about 40,000 g/mol and about 1,000,000 g/mol, or between about 50,000 g/mol and about 500,000 g/mol, or between about 60,000 g/mol and about 400,000 g/mol, or between about 70,000 g/mol and about 300,000 g/mol, or between about 80,000 g/mol and about 150,000 g/mol, for example.

In some variations, the reaction vessel is charged with the at least one polylactone. In certain embodiments, the reaction vessel may comprise an extruder, such as a twin-screw extruder. The extruder may have an inside temperature from about 10° C. to about 160° C. and an inside pressure from about 10 bar to about 15 bar, for example.

Optionally, in some embodiments, carbon dioxide, such as supercritical carbon dioxide or nitrogen, for example, may be used as a blowing agent in the foam production. In some embodiments, pentane, isopentane, or cyclopentane, for example, may be used as a blowing agent in the foam production.

Optionally, in some embodiments, the composition may further comprise a nucleating agent. Optionally, in some embodiments, the composition may further comprise additives, such as those selected from the group consisting of: antioxidants, light stabilizers, fibers, foaming additives, electrically conductive additives, antiblocking agents, antistatic agents, heat stabilizers, impact modifiers, biocides, compatibilizers, tackifiers, colorants, coupling agents, branching agents, curing agents, and pigments, for example.

In another embodiment, a foam composition may comprise a compostable polylactone. In some variations, the compostable polylactone has the following repeating unit:

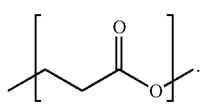

In some embodiments, the compostable polylactone comprises n repeating units, wherein n is from about 4,000 to about 1,000,000. In other embodiments, the compostable polylactone has one or more end groups. In certain embodiments, the one or more end groups are independently selected from the group consisting of: H, alkyl, alkenyl, alkoxy, alkynyl, cycloalkyl, cycloalkenyl, cycloalkynyl, ester, amine, aniline, and amide.

In other variations, the compostable polylactone has the following structure:

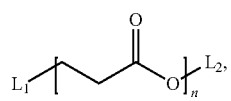

wherein n is from about 4,000 to about 1,000,000; $L_1$ and $L_2$ may be independently selected the group consisting of H, alkyl, alkenyl, alkoxy, alkynyl, cycloalkyl, cycloalkenyl, cycloalkynyl, ester, amine, aniline, and amide.

Definitions of specific functional groups and chemical terms are described in more detail below. The chemical elements are identified in accordance with the Periodic Table of the Elements, CAS version, *Handbook of Chemistry and Physics*, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987.

The term "alkyl" as used herein refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In some aspects, alkyl groups contain 1-8 carbon atoms. In some aspects, alkyl groups contain 1-6 carbon atoms. In some aspects, alkyl groups contain 1-5 carbon atoms. In some aspects, alkyl groups contain 1-4 carbon atoms. In yet other aspects, alkyl groups contain 1-3 carbon atoms, and in yet other aspects alkyl groups contain 1-2 carbon atoms. Examples of alkyl radicals include, but are not limited to: methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned may include those that result in the formation of stable or chemically feasible compounds. The term "stable", as used herein, refers to compounds that are not substantially altered when subjected to conditions to allow for their production, detection, and, in some aspects, their recovery, purification, and use for one or more of the purposes disclosed herein.

In certain embodiments, the compostable polylactone is in the form of a compostable polylactone melt. In further embodiments, the compostable polylactone melt may have greater than about 60% by weight, greater than about 70% by weight, greater than about 80% by weight, greater than about 90% by weight, greater than about 95%, or greater than about 99% biobased content, for example. Optionally, in some embodiments, the compostable polylactone melt may have a temperature from about 10° C. to about 160° C. and a pressure from about 10 bar to about 15 bar.

While this disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

DETAILED DESCRIPTION

The following description sets forth exemplary processes, parameters and the like. It should be recognized, however, that such description is not intended as a limitation on the scope of the present disclosure but is instead provided as a description of exemplary aspects.

In some aspects, provided are polylactone-based foams comprising at least one polylactone polymer.

In some variations, a "polymer" is a molecule of high relative molecular mass, the structure of which comprises the multiple repetition of units derived from molecules of low relative molecular mass. In some aspects, a polymer is comprised of only one monomer species. In some aspects, a polymer is a copolymer, terpolymer, heteropolymer, block copolymer, or tapered heteropolymer of one or more monomer species.

In certain preferred embodiments, the polylactone polymer comprises at least one beta-lactone monomer. In certain preferred embodiments, at least one beta-lactone monomer is produced via carbonylation of an epoxide with carbon monoxide. In certain embodiments, the epoxide and/or carbon monoxide are biobased. In certain embodiments, the polylactone-based foams may be produced from any of the beta-lactones provided in Column B of Table 1 below. As shown in Table 1 and in the following chemical equation, such beta-lactones in Column B may be produced from the corresponding epoxide listed in Column A of the table.

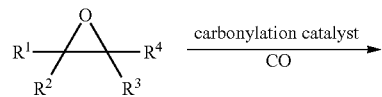

-continued

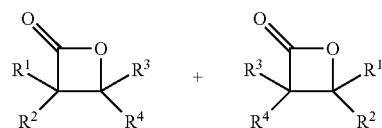

wherein $R^1$, $R^2$, $R^3$, and $R^4$ include any of the substituents from any of the structures in Table 1 below.

TABLE 1

| Column A | Column B |
|---|---|
| ![epoxide] | ![β-lactone] |
| ![propylene oxide] | ![β-methyl lactone] or/and ![β-methyl lactone isomer] |
| ![epichlorohydrin] | ![chloromethyl β-lactone] |
| ![CF3 epoxide] | ![CF3 β-lactone] |
| ![OSO2Me epoxide] | ![OSO2Me β-lactone] |
| ![OTBS epoxide] | ![OTBS β-lactone] |
| ![OMe epoxide] | ![OMe β-lactone] |
| ![OEt epoxide] | ![OEt β-lactone] |

TABLE 1-continued

| Column A | Column B |
|---|---|
| glycidyl acetate | 4-(acetoxymethyl)oxetan-2-one |
| allyl glycidyl ether | 4-((allyloxy)methyl)oxetan-2-one |
| isopropyl glycidyl ether | 4-((isopropoxy)methyl)oxetan-2-one |
| n-butyl glycidyl ether | 4-((n-butoxy)methyl)oxetan-2-one |
| benzyl glycidyl ether | 4-((benzyloxy)methyl)oxetan-2-one |
| Bz glycidyl ether | 4-((benzoyloxy)methyl)oxetan-2-one |
| 3,3,3-trifluoropropylene oxide | 4-(2,2,2-trifluoroethyl)oxetan-2-one |
| 1,2-epoxybutane | 4-ethyloxetan-2-one |
| benzyl 2-(oxiran-2-yl)ethyl ether | 4-(2-(benzyloxy)ethyl)oxetan-2-one |
| tetrafluoroethyl glycidyl ether | 4-(((1,1,2,2-tetrafluoroethoxy)methyl)oxetan-2-one |

TABLE 1-continued
| Column A | Column B |
|---|---|
| 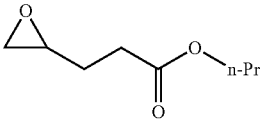 | 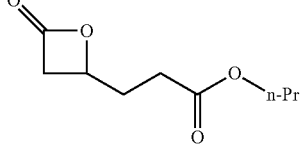 |
| 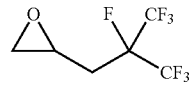 | 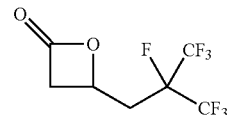 |
| 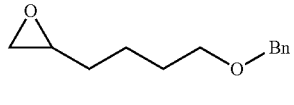 [SMILES: c1ccc(COCCCCC2CO2)cc1] | 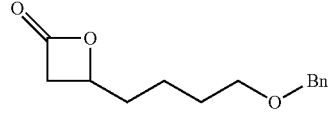 [SMILES: O=C1CC(CCCCOCc2ccccc2)O1] |
| 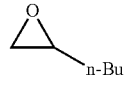 | 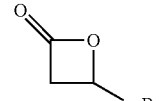 |
| 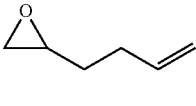 | 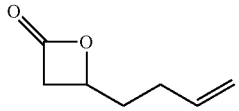 |
| 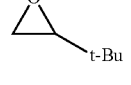 | 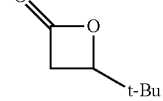 |
| 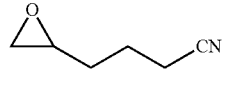 | 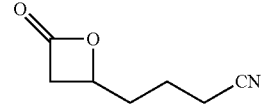 |
| 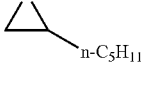 | 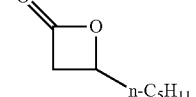 |
| 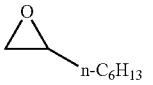 | 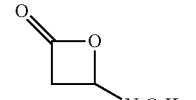 |
|  | 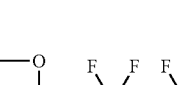 |
| 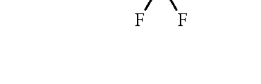 | 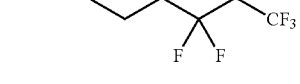 |
| 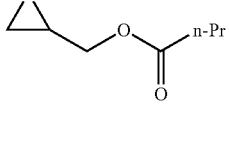 | 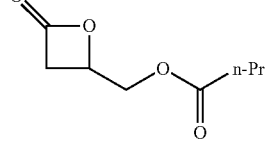 |

TABLE 1-continued
| Column A | Column B |
|---|---|
| 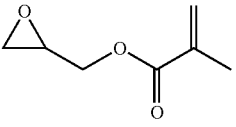 | 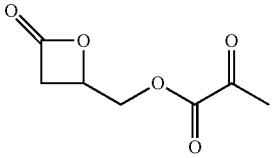 |
| 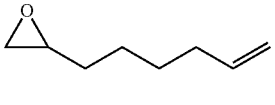 | 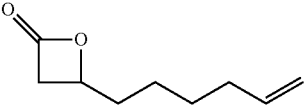 |
| 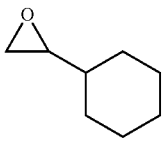 | 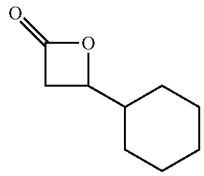 [SMILES: O=C1CC(C2CCCCC2)O1] |
|  | 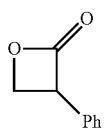 |
| 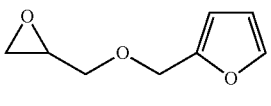 | 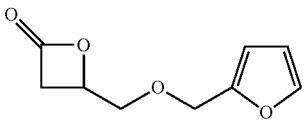 [SMILES: O=C1CC(COCc2ccco2)O1] |
| 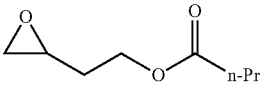 | 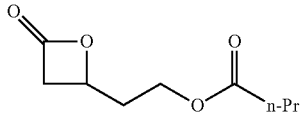 |
| 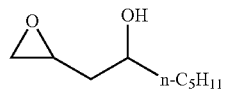 | 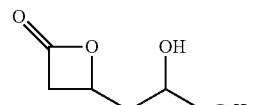 |
| 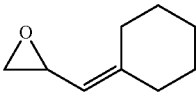 | 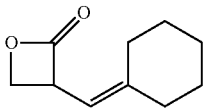 |
| 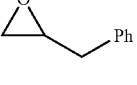 | 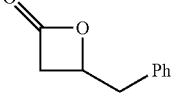 |
| 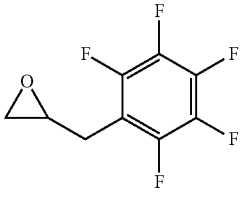 [SMILES: Fc1c(F)c(F)c(CC2CO2)c(F)c1F] | 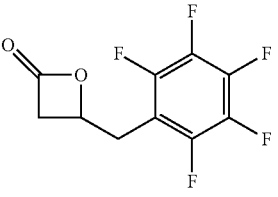 [SMILES: O=C1CC(Cc2c(F)c(F)c(F)c(F)c2F)O1] |
| 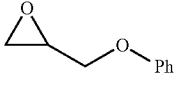 | 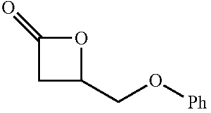 [SMILES: O=C1CC(COc2ccccc2)O1] |

TABLE 1-continued
| Column A | Column B |
|---|---|
| 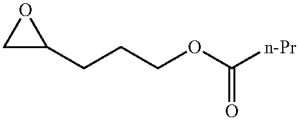 | 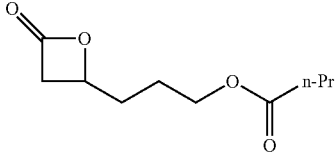 |
| 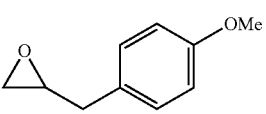 [SMILES: COc1ccc(CC2CO2)cc1] | 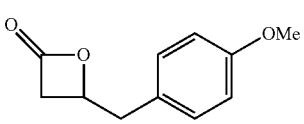 |
| 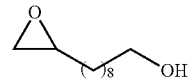 | 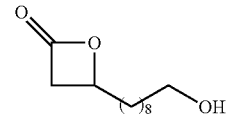 |
| 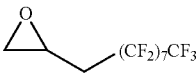 | 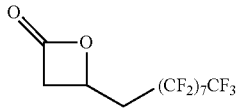 |
| 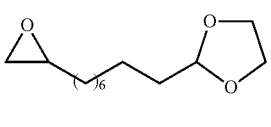 | 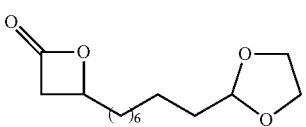 |
| 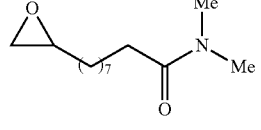 | 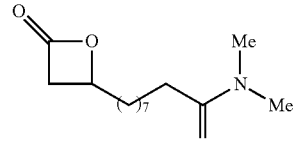 |
| 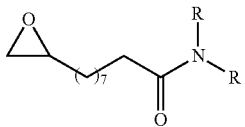 | 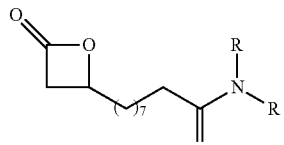 |
|  | 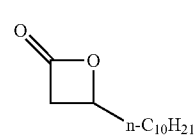 |
|  | 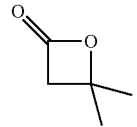
and/or
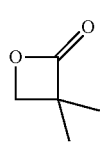 |

TABLE 1-continued

| Column A | Column B |
|---|---|

TABLE 1-continued
| Column A | Column B |
|---|---|
| 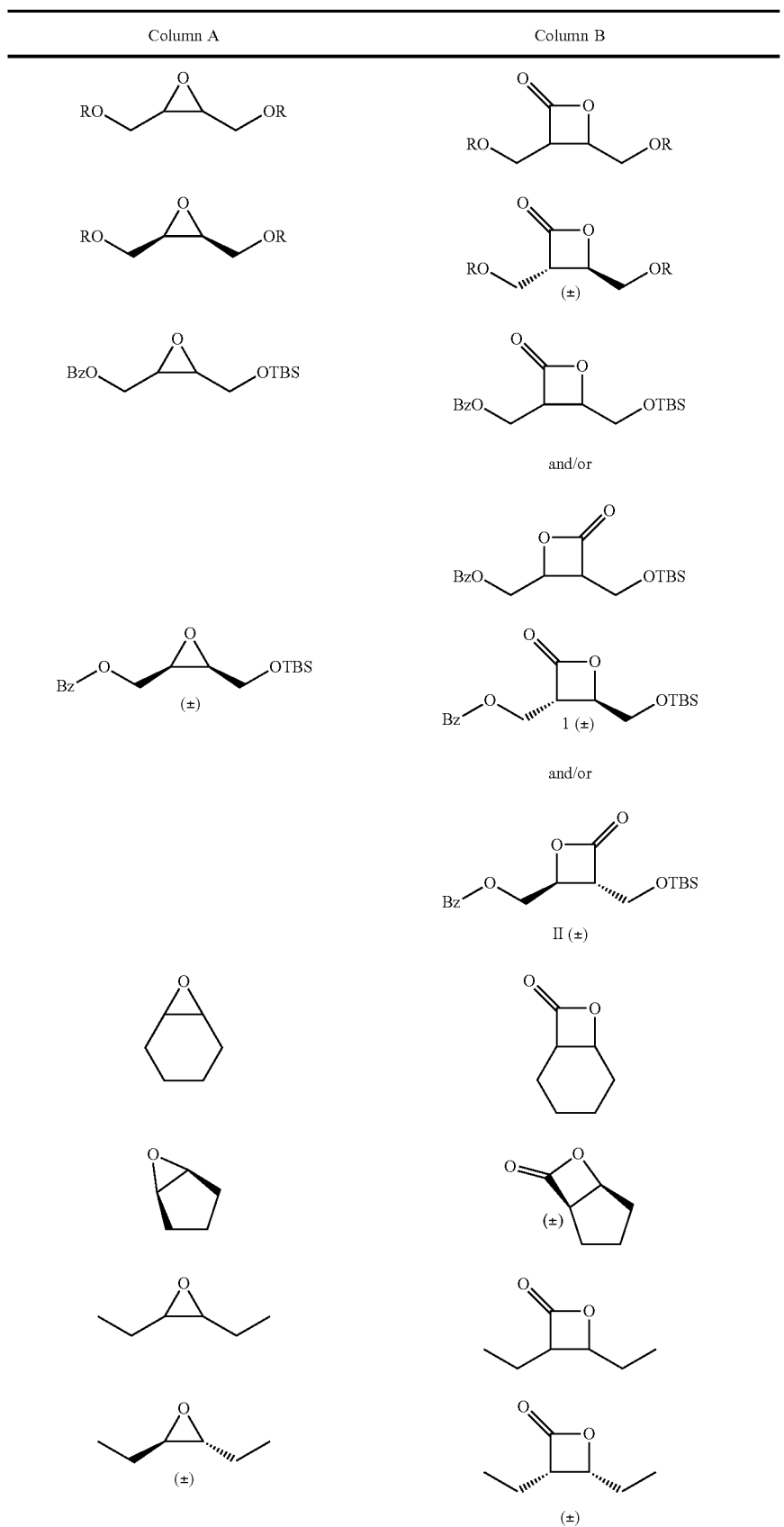 | |

TABLE 1-continued
| Column A | Column B |
|---|---|
| 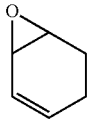 | 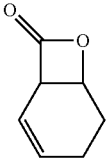 |
| 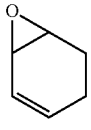 | 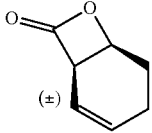 (±) |
| 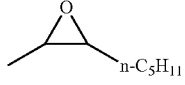 | 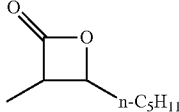 and/or 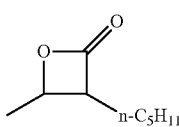 |
| 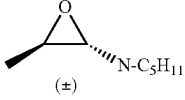 (±) | 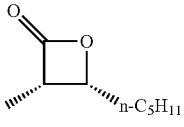 I (±) and/or 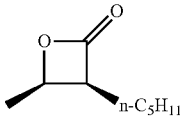 II (±) |
| 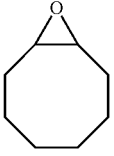 | 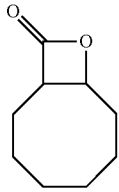 [SMILES: O=C1OC2CCCCCCC12] |
|  | 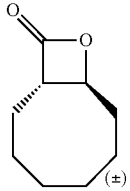 [SMILES: O=C1O[C@H]2CCCCCC[C@H]12] (±) |
| 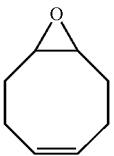 | 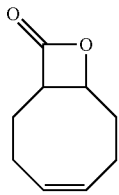 [SMILES: O=C1OC2CC/C=C\CCC12] |

TABLE 1-continued

| Column A | Column B |
|---|---|

TABLE 1-continued
| Column A | Column B |
|---|---|
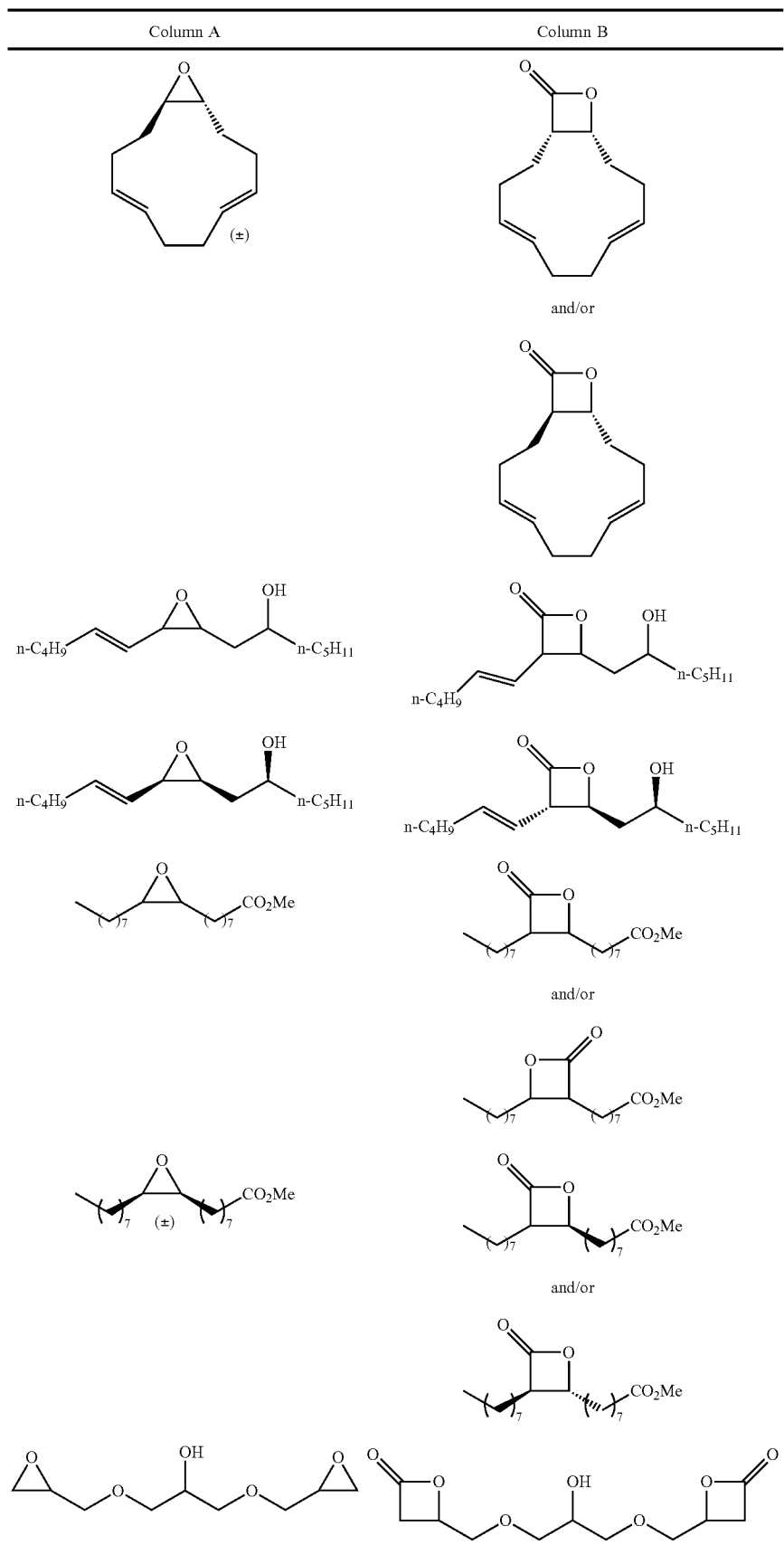

TABLE 1-continued

| Column A | Column B |
|---|---|
| 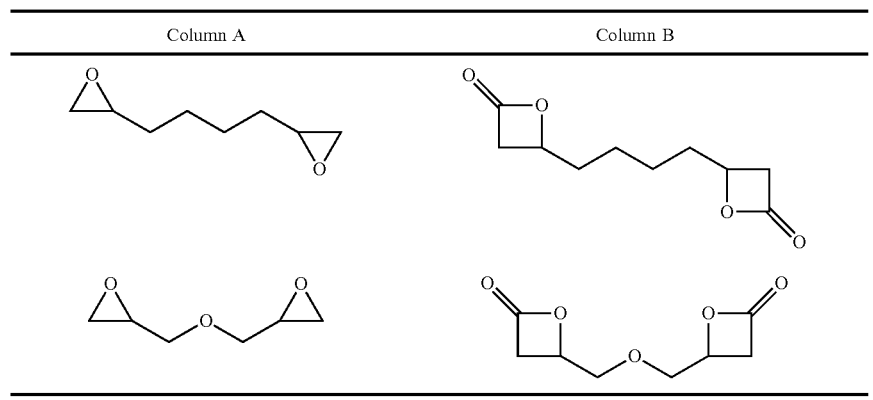 | |

Preferably, in some embodiments, the polylactone polymers used in the present materials break down by composting. The degradation characteristics of the polylactone-based foam may be selected by modifying the structure of the polylactone polymer chain, for example, by increasing or decreasing the number of ester groups in the polylactone polymer chain.

The present invention describes compostable and/or biobased foams that are useful for fabricating foamed articles. The foams of this invention are produced using a compound comprising a compostable and/or biobased polylactone, such as a polypropiolactone or an end-capped polypropiolactone polymer and a blowing agent.

In some variations, an "end-capped polypropiolactone" comprises a polypropiolactone polymer that is reacted with one or more end-capping agents to produce a thermally stable polymer. In some aspects, the end-capping agent is an aniline derivative selected from the group consisting of: benzothiazole, benzoxazole, benzimidazole, 2-aminothiophenol, o-phenylenediamine, and 2-aminophenol. In other embodiments, the end-capping agent is a phosphate selected from the group consisting of trimethylphospohate and triphenylphosphate. Suitable end-capping agents may even further include other additives and stabilizers such as isophthalic acid.

The compostable and/or biobased polylactone polymers may include those polylactone polymers that decompose into compounds having lower molecular weight polylactones such as polypropiolactone.

In some embodiments, the polylactone may comprise polyacetolactone, poly-β-propiolactone, poly-γ-butyrolactone, and poly-δ-valerolactone, for example.

Preferably, in certain embodiments, the polylactone polymers used to produce the foams of the present invention are biobased. For example, the polylactone polymers have greater than 20% biobased content, greater than 60% biobased content, more preferably greater than 70% biobased content, more preferably 80% biobased content, more preferably 90% biobased content, more preferably 95% biobased content, and more preferably 99% biobased content, for example.

The terms "bio-content" and "biobased content" mean biogenic carbon also known as biomass-derived carbon, carbon waste streams, and carbon from municipal solid waste. In some variations, bio-content (also referred to as "biobased content") can be determined based on the following:

Bio-content or Biobased content=[Bio (Organic) Carbon]/[Total (Organic) Carbon]*100%, as determined by ASTM D6866 (Standard Test Methods for Determining the Biobased (biogenic) Content of Solid, Liquid, and Gaseous Samples Using Radiocarbon Analysis).

For example, as disclosed in US 2017/0002136, the ASTM D6866 method allows the determination of the biobased content of materials using radiocarbon analysis by accelerator mass spectrometry, liquid scintillation counting, and isotope mass spectrometry. When nitrogen in the atmosphere is struck by an ultraviolet-light-produced neutron, it loses a proton and forms carbon that has a molecular weight of 14, which is radioactive. This $^{14}C$ is immediately oxidized into carbon dioxide, and represents a small, but measurable, fraction of atmospheric carbon. Atmospheric carbon dioxide is cycled by green plants to make organic molecules during photosynthesis. The cycle is completed when the green plants or other forms of life metabolize the organic molecules and produce carbon dioxide that is then able to return back to the atmosphere. Virtually all forms of life on Earth depend on this green-plant production of organic molecules to produce the chemical energy that facilitates growth and reproduction. Therefore, the $^{14}C$ that exists in the atmosphere becomes part of all life forms and their biological products. These renewably based organic molecules that biodegrade to carbon dioxide do not contribute to global warming because no net increase of carbon is emitted to the atmosphere. In contrast, fossil-fuel-based carbon does not have the signature radiocarbon ratio of atmospheric carbon dioxide. See WO 2009/155086.

The application of ASTM D6866 to derive a "biobased content" is built on the same concepts as radiocarbon dating, but without the use of the age equations. The analysis is performed by deriving a ratio of the amount of radiocarbon ($^{14}C$) in an unknown sample to that of a modern reference standard. The ratio is reported as a percentage, with the units "pMC" (percent modern carbon). If the material being analyzed is a mixture of present-day radiocarbon and fossil carbon (containing no radiocarbon), then the pMC value obtained correlates directly to the amount of biobased material present in the sample. The modern reference standard used in radiocarbon dating is a NIST (National Institute of Standards and Technology) standard with a known radiocarbon content equivalent approximately to the year AD 1950. The year AD 1950 was chosen because it represented a time prior to thermonuclear weapons testing which introduced large amounts of excess radiocarbon into the atmosphere with each explosion (termed "bomb carbon"). The AD 1950 reference represents 100 pMC. "Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. The distribution of bomb carbon has gradually decreased over time, with today's value being near 107.5 pMC. As a result, a fresh biomass material, such as corn, could result in a radiocarbon signature near 107.5 pMC.

Petroleum-based carbon does not have the signature radiocarbon ratio of atmospheric carbon dioxide. Research has noted that fossil fuels and petrochemicals have less than about 1 pMC, and typically less than about 0.1 pMC, for example, less than about 0.03 pMC. However, compounds derived entirely from renewable sources have at least about 95 percent modern carbon (pMC); they may have at least about 99 pMC, including about 100 pMC.

Combining fossil carbon with present-day carbon into a material will result in a dilution of the present-day pMC content. By presuming that 107.5 pMC represents present day biobased materials and 0 pMC represents petroleum derivatives, the measured pMC value for that material will reflect the proportions of the two component types. A material derived 100% from present day biomass would give a radiocarbon signature near 107.5 pMC. If that material were diluted with 50% petroleum derivatives, it would give a radiocarbon signature near 54 pMC.

A biobased content result is derived by assigning 100% equal to 107.5 pMC and 0% equal to 0 pMC. In this regard, a sample measuring 99 pMC will give an equivalent biobased content result of 93%.

Assessment of the materials described herein according to the present embodiments is performed in accordance with ASTM D6866 revision 12 (i.e., ASTM D6866-12), the entirety of which is herein incorporated by reference. In some embodiments, the assessments are performed according to the procedures of Method B of ASTM-D6866-12. The mean values encompass an absolute range of 6% (plus and minus 3% on either side of the biobased content value) to account for variations in end-component radiocarbon signatures. It is presumed that all materials are present day or fossil in origin and that the desired result is the amount of biobased carbon "present" in the material, not the amount of bio-material "used" in the manufacturing process.

Other techniques for assessing the biobased content of materials are described in, for example, U.S. Pat. Nos. 3,885,155, 4,427,884, 4,973,841, 5,438,194, and 5,661,299, and WO 2009/155086.

In some embodiments, the foams and the polylactone polymers used to produce the foams described herein are obtained from renewable sources. In some variations, "renewable sources" include sources of carbon and/or hydrogen obtained from biological life forms that can replenish itself in less than one hundred years.

In some embodiments, the foams and the polylactone polymers used to produce the foams described herein have at least one renewable carbon. In some variations, "renewable carbon" refers to a carbon obtained from biological life forms that can replenish itself in less than one hundred years.

In some embodiments, the foams and the polylactone polymers used to produce the foams described herein are obtained from recycled sources. In some variations, "recycled sources" include sources of carbon and/or hydrogen recovered from a previous use in a manufactured article.

In some embodiments, the foams and the polylactone polymers used to produce the foams described herein have a recycled carbon. In some variations, "recycled carbon" refers to a carbon recovered from a previous use in a manufactured article.

Preferably, in other aspects, the polylactone polymers used herein may be processed using conventional melt-processing techniques, such as single and twin-screw extrusion processes. In one embodiment, foamed structures are produced by cutting extrudate comprising biobased polylactone at the face of the extrusion die and subsequently optionally cooling by contacting with water, water vapor, air, carbon dioxide, or nitrogen gas.

In some variations, a "melt processable composition" comprises a formulation that is melt processed, typically at elevated temperatures, by conventional polymer-processing techniques, such as extrusion or injection molding.

In some variations, "melt-processing techniques" includes extrusion, injection molding, blow molding, rotomolding, or batch mixing.

In some variations, an "extrudate" comprises the semi-solid material that has been extruded and shaped into a continuous form by forcing the material through a die opening.

Molded product material can be made by a variety of processes, including blow molding, injection molding, open-pot molding, and thermoforming. Blow molding is employed to make hollow shapes, especially packaging containers. In an extrusion embodiment of this process, a parison is made first and then expanded to the walls of the mold cavity.

Thermoforming is a branch of molding that uses thick films or sheets of thermoplastic. Because polylactones may be easily converted to film or sheet forms that have excellent transparency, they are excellent candidates for thermoforming. The sheet may be heated to the point that it is quite flexible and then subjected to vacuum or pressure that presses the sheet against a mold, forming the desired shape. The plastic memory of these polymer-plasticizer combinations is a useful attribute in drape-forming embodiments of thermoforming.

In some embodiments, a plasticizer may be added or incorporated into the composition to address desired physical characteristics of the melt processable composition. In some variations, plasticizers include polyalkylene glycols and functionalized naturally occurring oils. In some variations, polyalkylene glycols include polyethylene glycols sold under the Carbowax trade name (Dow Chemical Co., Midland, Mich.). In some variations, functionalized naturally occurring oils include malinated or epoxidized soybean, linseed, or sunflower oils.

In another embodiment, the compostable and/or biobased composition may include a chain extender to increase the molecular weight of the compostable or biobased polymer during melt processing. This also has the effect of increasing melt viscosity and strength, which can improve the foamability of the compostable or biobased polymer. In some variations, a "chain extender" comprises a material that, when melt processed with a polymer, increases the molecular weight by reactively coupling chain ends. An example of chain extenders useful herein include those marketed under the CESA-extend trade name from Clariant, and those marketed under the Johncryl trade name from BASF.

In another aspect, the compostable and/or biobased melt-processable composition may contain other additives. In some variations, additives include antioxidants, light stabilizers, fibers, blowing agents, foaming additives, antiblocking agents, heat stabilizers, impact modifiers, biocides, compatibilizers, tackifiers, colorants, coupling agents, antistatic agents, electrically conductive fillers, and pigments.

In certain variations, the additives incorporated into the foam have performance-enhancing properties. For example, in one variation, the additives include antioxidants and stabilizers that protect the foam from oxidative (or UV-induced) degradation; or light stabilizers that protect the material from light-induced degradation.

The additives may be incorporated into the melt-processable composition in the form of powders, pellets, granules, or in any other extrudable form. The amount and type of additives in the melt-processable composition may vary depending upon the polymeric matrix and the desired physical properties of the finished composition. Those skilled in the art of melt processing are capable of selecting appropriate amounts and types of additives to match with a specific polymeric matrix in order to achieve the desired physical properties of the finished material.

In some variations, the biobased foams produced according to the methods described herein exhibit desirable properties in applications requiring vibration dampening, shock absorption, low weight, and buoyancy.

In another embodiment, more than about 60 wt % of the foam is produced from compostable materials, as determined by ASTM D6400. In a preferred embodiment, more than about 80 wt % of the foam is produced from compostable materials. In a most preferred embodiment, greater than about 95 wt % of the foam is produced from compostable materials.

The compostable polymers of this invention are produced by melt processing compostable polymers with a blowing agent and, optionally, additives that modify the rheology of the compostable or biobased polymer, including chain extenders and plasticizers.

In preferred embodiments, a polylactone polymer is combined with a blowing agent to produce a foam. The suitable blowing agents of the present invention are materials that can be incorporated into the melt-processable composition (e.g., the premix of the additives, polymeric matrix, and/or optional fillers, either in melt or solid form) to produce cells. The amount and types of blowing agents influence the density of the finished product by its cell structure. Any suitable blowing agent may be used to produce the foamed material.

In certain preferred embodiments, the blowing agents not incorporated into a polymer chain comprising beta-lactone monomers are termed physical blowing agents. In certain embodiments, a physical blowing agent disperses polymer chains to produce cells. In a preferred embodiment, the physical blowing agent is carbon dioxide. In some embodiments, the physical blowing agent is uniformly distributed in a melt-processable composition with the polymer to provide a uniform cellular structure. In certain embodiments, the physical blowing agents include one or more carbonate salts such as sodium, calcium, potassium, and/or magnesium carbonate salts. Preferably, sodium bicarbonate is used because it is inexpensive and it readily decomposes to form carbon dioxide gas. Sodium bicarbonate gradually decomposes when heated above about 120° C., with significant decomposition occurring between approximately 150° C. and approximately 200° C. In general, the higher the temperature, the more quickly the sodium bicarbonate decomposes. An acid, such as citric acid, may also be included in the foaming additive, or added separately to the melt-processable composition, to facilitate decomposition of the blowing agent.

In certain other embodiments, blowing agents include water; carbonate salts and other carbon-dioxide-releasing materials; diazo compounds and other nitrogen-producing materials; carbon dioxide; decomposing polymeric materials such as poly(t-butylmethacrylate) and polyacrylic acid; alkane and cycloalkane gases such as pentane and butane; inert gases such as nitrogen, and the like. The blowing agent may be hydrophilic or hydrophobic. In one embodiment, the blowing agent may be a solid blowing agent. In another embodiment, the blowing agent may include one or more carbonate salts such as sodium, potassium, calcium, and/or magnesium carbonate salts. In yet another embodiment, the blowing agent may be inorganic. The blowing agent may also include sodium carbonate and sodium bicarbonate, or, alternatively, sodium bicarbonate alone.

Although the blowing agent composition may include only the blowing agent, in other embodiments, the blowing agent includes a polymeric carrier that is used to carry or hold the blowing agent. This blowing agent concentrate may be dispersed in the polymeric carrier for transport and/or handling purposes. The polymeric carrier may also be used to hold or carry any of the other materials or additives that are desired to be added to the melt-processable composition.

The inclusion levels of the blowing agent in the concentrate may vary widely. In some embodiments, foams include at least about 2.5 wt % of blowing agent, at least about 5 wt % of blowing agent, or, suitably, at least about 10 wt % of blowing agent. In other embodiments, foams may include from about 10 wt % to about 60 wt % of blowing agent, from about 15 wt % to about 50 wt % of blowing agent, or, suitably, from about 20 wt % to about 45 wt % of blowing agent. In yet further embodiments, the foaming additive may include from about 0.05 wt % to about 90 wt % of blowing agent, from about 0.1 wt % to about 50 wt % of blowing agent, or from about 1 wt % to about 26 wt % of blowing agent.

As mentioned previously, the blowing agent concentrate may also include a polymeric carrier or material that is used to hold the other additives to form a single additive. The polymeric carrier or polymeric component may be any suitable polymeric material such as hydrocarbon or non-hydrocarbon polymers. The polymeric carrier should be capable of being melted or melt processed at temperatures below the activation temperature of the blowing agent. In some instances, however, a polymeric component having a melting point above the activation temperature of the blowing agent may be used as long as it is processed quickly enough so that a suitable amount of active blowing agent remains. In one embodiment, the polymeric carrier has a melting point of no more than about 150° C., no more than about 125° C., no more than about 100° C., or, suitably, no more than about 80° C. In a preferred embodiment, the blowing agent concentrate contains a compostable or biobased polymer.

In certain preferred embodiments, one or more chemical blowing agents may react with one or more polymer chains to produce a gas suitable for dispersing the polymer chains to produce cells.

In some variations, the blowing agent is injected into the extruder in the zone before the polymer melt is passed through the die. In certain variations, the blowing agent is fed as a pressurized liquid, mixed into the polymer melt and allowed to degas and foam as the melt exits the extruder.

In some variations, moldability of the compositions described herein can be improved by adding a nucleating agent. The dispersion of a nucleating agent within the polymer mixture helps in forming a uniform cell structure.

In some variations, a "nucleating agent" comprises a material that is added to a polymer melt that provides sites for crystal formation. For example, a higher degree of crystallinity and more uniform crystalline structure may be obtained by adding a nucleating agent. In certain variations, the foams produced according to the methods described herein have a crystallinity of at least 50%, at least 60%, at least 70%, at least 80%, at least 90%, or at least 95%; or between 50% and 99%, or between 60% and 95%.

Examples of nucleating agents include inorganic powders such as: talc, kaolin, mica, silica, calcium carbonate, barium sulfate, titanium oxide, aluminum oxide, clay, bentonite, and diatomaceous earth, and known chemical blowing agents such as azodicarbodiamide. Among them, in one variation, talc is preferred because it may facilitate control of the cell diameter. The content of the nucleating agent varies depending on the type of the nucleating agent and the intended cell diameter.

The amount of components in the melt-processable, compostable and/or biobased foam composition may vary depending upon the intended end-use application. The final composition may comprise from about 40 wt % to about 99 wt % of a compostable or biobased polymer. The blowing agent may be included in the final composition at a level of up to about 20 wt %. The final composition may comprise from about 1 wt % to about 50 wt % of a compostable or biobased plasticizer. The final composition may comprise from about 0.1 wt % to about 10 wt % of a chain extender. Nucleating agents (such as talc) can be included in the final composition up to about 5 wt %, more preferably less than about 1 wt %, and most preferably about 0.5 wt %.

The physical blowing agent, such as supercritical carbon dioxide, is combined with the melt early in the extruder mixing process. Then, as the mixture exits the extruder and is cut, the supercritical carbon dioxide expands to form the foamed structures. Optionally, heating of the foamed structures during a secondary expansion process allows for expansion of the material to lower density.

In the extrusion foaming process, the temperature profile of the extruder must be carefully controlled to allow for: melting and mixing of the solids, reaction with the chain-extension agent (optional), mixing with blowing agent (for example, supercritical $CO_2$), and cooling of the melt mixture prior to extrusion through the die. The temperatures of the initial barrel sections allow for melting and mixing of the solids, including the dispersion of nucleating agent within the melt. At the same time, the optional chain-extension agent reacts with the chain ends of the polymer, increasing branching and molecular weight, which increases viscosity of the melt and improves the melt strength of the plastic. Prior to injection of the blowing agent, a melt seal is created within the extruder by careful design of internal screw elements to prevent the flow of the blowing agent from exiting the feed throat. The melt seal maintains pressure within the extruder, allowing the blowing agent to remain soluble within the melted plastic. After injection of the blowing agent, mixing elements are used to mix the blowing agent with the melt. Soluble blowing agent within the melt plasticizes the melt dramatically, greatly reducing its viscosity. The plasticization effect allows for the cooling of the melt to below the normal melting temperature of the compostable or biobased polymer in the final sections of the extruder. The cooling is necessary to increase the viscosity of the plasticized melt, allowing for retention of a closed cell structure during foaming at the die.

Nucleating agents serve as nucleation sites for blowing-agent evolution during foaming. When depressurization occurs at the die, the blowing agent dissolved in the plastic melt comes out of solution into the gas phase. By entering the gas phase, the volume occupied by the blowing agent increases dramatically, producing a foamed structure. By dispersion of the nucleating agent in the melt, the blowing agent will evenly evolve from its soluble state within the melt to its gaseous form during depressurization, thus producing a fine cellular foam. Without properly dispersed nucleation sites, the foaming can be uneven, producing large voids or open cell structure, where cell walls are fractured and interconnected. Large voids and open cell structure creates a harder, more brittle foam. Very low density foams with closed cell structure can be described as spongy, having a good elastic recovery after significant compression.

As extrudate exits the die and is foamed, rotating knives of the pelletizer cut the bead at the face of the die. When cut, the foam is not completely established. The foaming process continues to shape the structure of the bead after it has been cut. The blowing agent continues to evolve, expanding the particle. The outer skin of the particle remains rubbery while cut, allowing the surface of the foamed bead to flow and reform a smooth, solid surface.

The melt-processable, compostable or biobased foam composition of the invention can be prepared by any of a variety of ways. For example, the compostable or biobased polymer, blowing agent, nucleating agent, and optional additives can be combined together by any of the blending means usually employed in the plastics industry, such as with a mixing extruder. The materials may, for example, be used in the form of a powder, a pellet, or a granular product. The mixing operation is most conveniently carried out at a temperature above the melting point or softening point of the polymer. The resulting melt-blended mixture can be processed into foamed structures by cutting the extrudate mixture of polymer and blowing agent at the face of the extrusion die. By cutting the extrudate at the face of the extrusion die, a bead is formed before complete expansion of the foam has occurred. After pelletization, a foamed bead is formed from expansion of the extrudate by the blowing agent. The foamed bead cools by the release of blowing agent, but subsequent cooling can be applied by contacting with water, water vapor, air, carbon dioxide, or nitrogen gas. The resulting foamed structures can be molded into a three-dimensional part using conventional equipment utilized in molding expandable polystyrene. In one embodiment, the foamed structures contain residual blowing agent and can be post-expanded in the molding process. In another embodiment, the foamed structures are pressurized with a gas, such as air or carbon dioxide, before molding to allow for expansion during molding.

Melt processing typically is performed at a temperature from about 80° C. to about 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The first two examples below utilize a single type of polylactone resin. It is known, however, that the degree of crystallinity in polylactone is controlled by two general aspects: first, by composition, and second, by process. Polylactone is selected from the group consisting of a polypropiolactone and an end-capped polypropiolactone.

All crystallinity is lost when the plastic is heated above its melting point, and a slow thermal annealing is required to induce crystallization. Fillers, such as high-performance talcs, are often used to promote a more rapid crystallization, yet most extrusion applications that are hoping to take advantage of high crystallinity for thermal stability will require an annealing step between 100° and 130° C. to sufficiently crystallize the PPL. However, in the extrusion foam application, there is sufficient shear and elongation during generation of the foam to induce crystallinity within the very thin films of plastic separating the closed cells of the foam. In addition, nucleating agents used to promote dispersion and nucleation of $CO_2$ dissolved into the melt during foam processing also improve crystallization kinetics. Therefore, the extrusion foam process induces rapid crystallization of PPL. From the perspective of thermal stability, this is fortuitous because no annealing step is required.

In certain aspects, the foams produced according to the methods described herein can be reprocessed into a film or thermolyzed to acrylic acid, for example, to make superabsorbent polymers.

As used herein, the term "about" preceding one or more numerical values means the numerical value ±5%. It should be understood that reference to "about" a value or parameter herein includes (and describes) aspects that are directed to that value or parameter per se. For example, description referring to "about x" includes description of "x" per se.

Further, it should be understood that reference to "between" two values or parameters herein includes (and describes) aspects that include those two values or parameters per se. For example, description referring to "between x and y" includes description of "x" and "y" per se.

The mass fractions disclosed herein can be converted to wt. % by multiplying by 100.

ENUMERATED EMBODIMENTS

The following enumerated embodiments are representative of some aspects of the invention.

1. A process for producing a foam, comprising the steps of heating a composition containing at least one polylactone derived from a bio-based content in a reaction vessel; and subjecting the heated polylactone composition to molding to give a foamed structure.

2. The process of embodiment 1, wherein at least one polylactone is selected from the group consisting of a polypropiolactone and an end-capped polypropiolactone.

3. The process of embodiment 2, wherein the polypropiolactone or end-capped polypropiolactone has a molecular weight of between about 40,000 g/mol and about 1,000,000 g/mol.

4. The process of embodiment 2, wherein the polypropiolactone or end-capped polypropiolactone has a molecular weight of between about 50,000 g/mol and about 500,000 g/mol.

5. The process of embodiment 2, wherein the polypropiolactone or end-capped polypropiolactone has a molecular weight of between about 60,000 g/mol and about 400,000 g/mol.

6. The process of embodiment 2, wherein the polypropiolactone or end-capped polypropiolactone has a molecular weight of between about 70,000 g/mol and about 300,000 g/mol.

7. The process of embodiment 2, wherein the polypropiolactone or end-capped polypropiolactone has a molecular weight of between about 80,000 g/mol and about 150,000 g/mol.

8. The process of embodiment 1, wherein the reaction vessel comprises an extruder.

9. The process of embodiment 8, wherein the extruder comprises a twin-screw extruder.

10. The process of embodiment 8, wherein the extruder has an inside temperature from about 10° C. to about 160° C. and an inside pressure from about 10 bars to about 15 bars.

11. The process of embodiment 1, wherein carbon dioxide or nitrogen is used as a blowing agent in the molding.

12. The process of embodiment 11, wherein supercritical carbon dioxide is used as a blowing agent in the molding.

13. The process of embodiment 1, wherein pentane, isopentane, or cyclopentane is used as a blowing agent in the molding.

14. The process of embodiment 1, further comprising the step of mixing the polymeric material with a blowing agent.

15. The process of embodiment 1, further comprising the step of charging the reaction vessel with at least one polylactone.

16. The process of embodiment 1, wherein the polylactone has greater than about 60% by weight biobased content.

17. The process of embodiment 1, wherein the polylactone has greater than about 70% by weight biobased content.

18. The process of embodiment 1, wherein the polylactone has greater than about 80% by weight biobased content.

19. The process of embodiment 1, wherein the polylactone has greater than about 90% by weight biobased content.

20. The process of embodiment 1, wherein the polylactone has greater than about 95% by weight biobased content.

21. The process of embodiment 1, wherein the polylactone has greater than about 99% by weight biobased content.

22. The process of embodiment 1, wherein the composition further comprises a nucleating agent.

23. The process of embodiment 1, wherein the composition further comprises one or more additives selected from the group consisting of antioxidants, light stabilizers, fibers, foaming additives, electrically conductive additives, anti-blocking agents, antistatic agents, heat stabilizers, impact modifiers, biocides, compatibilizers, tackifiers, colorants, coupling agents, branching agents, curing agents, and pigments.

24. A composition, comprising:
a compostable polylactone melt processed with at least one blowing agent into a mixture wherein the blowing agent is injected into the melt and the mixture is extruded into a foamed structure.

25. The composition of embodiment 24, wherein at least one blowing agent is selected from the group consisting of pentane, isopentane, cyclopentane, carbon dioxide, and nitrogen.

26. The composition of embodiment 24, wherein the at least one blowing agent is supercritical $CO_2$.

27. The composition of embodiment 24, wherein the compostable polylactone melt has greater than about 60% by weight biobased content.

28. The composition of embodiment 24, wherein the compostable polylactone melt has greater than about 70% by weight biobased content.

29. The composition of embodiment 24, wherein the compostable polylactone melt has greater than about 80% by weight biobased content.

30. The composition of embodiment 24, wherein the compostable polylactone melt has greater than about 90% by weight biobased content.

31. The composition of embodiment 24, wherein the compostable polylactone melt has greater than about 95% by weight biobased content.

32. The composition of embodiment 24, wherein the compostable polylactone melt has greater than about 99% by weight biobased content.

33. The composition of embodiment 24, wherein the polylactone is selected from the group consisting of a polypropiolactone and an end-capped polypropiolactone.

34. The composition of embodiment 33, wherein the polypropiolactone or end-capped polypropiolactone has a molecular weight of between about 40,000 g/mol and about 1,000,000 g/mol.

35. The composition of embodiment 33, wherein the polypropiolactone or end-capped polypropiolactone has a molecular weight of between about 50,000 g/mol about 500,000 g/mol.

36. The composition of embodiment 33, wherein the polypropiolactone or end-capped polypropiolactone has a molecular weight of between about 60,000 g/mol and about 400,000 g/mol.

37. The composition of embodiment 33, wherein the polypropiolactone or end-capped polypropiolactone has a molecular weight of between about 70,000 g/mol about 300,000 g/mol.

38. The composition of embodiment 33, wherein the polypropiolactone or end-capped polypropiolactone has a molecular weight of between about 80,000 g/mol and about 150,000 g/mol.

39. The composition of embodiment 24, further comprising a nucleating agent.

40. The composition of embodiment 24, further comprising one or more additives selected from the group consisting of antioxidants, light stabilizers, fibers, foaming additives, electrically conductive additives, antiblocking agents, antistatic agents, heat stabilizers, impact modifiers, biocides, compatibilizers, tackifiers, colorants, coupling agents, branching agents, curing agents, and pigments.

41. The composition of embodiment 24, wherein the compostable polylactone melt has a temperature from about 10° C. to about 160° C. and a pressure from about 10 bars to about 15 bars.

42. A composition, comprising:
an extrudate of a compostable polylactone derived from a biobased content containing a blowing agent wherein the extrudate is of a viscosity and density suitable for forming a foam with substantial stability and durability.

43. The composition of embodiment 42, wherein the blowing agent is selected from the group consisting of pentane, isopentane, cyclopentane, carbon dioxide and nitrogen.

44. The composition of embodiment 42, wherein the blowing agent is super critical $CO_2$.

45. The composition of embodiment 42, wherein the extrudate has greater than about 60% by weight biobased content.

46. The composition of embodiment 42, wherein the extrudate has greater than about 70% by weight biobased content.

47. The composition of embodiment 42, wherein the extrudate has greater than about 80% by weight biobased content.

48. The composition of embodiment 42, wherein the extrudate has greater than about 90% by weight biobased content.

49. The composition of embodiment 42, wherein the extrudate has greater than about 95% by weight biobased content.

50. The composition of embodiment 42, wherein the extrudate has greater than about 99% by weight biobased content.

51. The composition of embodiment 42, wherein the polylactone is selected from the group consisting of a polypropiolactone and an end-capped polypropiolactone.

52. The composition of embodiment 51, wherein the polypropiolactone or end-capped polypropiolactone has a molecular weight of between about 40,000 g/mol and about 1,000,000 g/mol.

53. The composition of embodiment 51, wherein the polypropiolactone or end-capped polypropiolactone has a molecular weight of between about 50,000 g/mol about 500,000 g/mol.

54. The composition of embodiment 51, wherein the polypropiolactone or end-capped polypropiolactone has a molecular weight of between about 60,000 g/mol and about 400,000 g/mol.

55. The composition of embodiment 51, wherein the polypropiolactone or end-capped polypropiolactone has a molecular weight of between about 70,000 g/mol about 300,000 g/mol.

56. The composition of embodiment 51, wherein the polypropiolactone or end-capped polypropiolactone has a molecular weight of between about 80,000 g/mol and about 150,000 g/mol.

57. The composition of embodiment 42, further comprising a nucleating agent.

58. The composition of embodiment 42, further comprising one or more additives selected from the group consisting of antioxidants, light stabilizers, fibers, foaming additives, electrically conductive additives, antiblocking agents, antistatic agents, heat stabilizers, impact modifiers, biocides, compatibilizers, tackifiers, colorants, coupling agents, branching agents, curing agents, and pigments.

59. A process for producing a foam, comprising:
polymerizing at least one beta-lactone monomer to produce at least one polylactone; and blowing at least one polylactone to produce a polylactone-based foam.

60. The process of embodiment 59, further comprising carbonylating an epoxide with carbon monoxide to produce at least one beta-lactone monomer.

61. The process of embodiment 60, wherein the epoxide and/or carbon monoxide are comprised of biobased molecules.

62. The process of embodiment 59, wherein the at least one polylactone is selected from the group consisting of a polypropiolactone and an end-capped polypropiolactone.

63. The process of embodiment 62, wherein the polypropiolactone or end-capped polypropiolactone has a molecular weight of between about 40,000 g/mol and about 1,000,000 g/mol.

64. The process of embodiment 62, wherein the polypropiolactone or end-capped polypropiolactone has a molecular weight of between about 50,000 g/mol and about 500,000 g/mol.

65. The process of embodiment 62, wherein the polypropiolactone or end-capped polypropiolactone has a molecular weight of between about 60,000 g/mol and about 400,000 g/mol.

66. The process of embodiment 62, wherein the polypropiolactone or end-capped polypropiolactone has a molecular weight of between about 70,000 g/mol and about 300,000 g/mol.

67. The process of embodiment 62, wherein the polypropiolactone or end-capped polypropiolactone has a molecular weight of between about 80,000 g/mol and about 150,000 g/mol.

68. The process of embodiment 59, wherein carbon dioxide or nitrogen is used as a blowing agent.

69. The process of embodiment 59, wherein supercritical carbon dioxide is used as a blowing agent.

70. The process of embodiment 59, wherein pentane, isopentane, or cyclopentane is used as a blowing agent.

71. The process of embodiment 59, further comprising the step of mixing the polymeric material with a blowing agent.

72. The process of embodiment 59, wherein the polylactone has greater than about 60% by weight biobased content.

73. The process of embodiment 59, wherein the polylactone has greater than about 70% by weight biobased content.

74. The process of embodiment 59, wherein the polylactone has greater than about 80% by weight biobased content.

75. The process of embodiment 59, wherein the polylactone has greater than about 90% by weight biobased content.

76. The process of embodiment 59, wherein the polylactone has greater than about 95% by weight biobased content.

77. The process of embodiment 59, wherein the polylactone has greater than about 99% by weight biobased content.

78. The process of embodiment 59, wherein the composition further comprises a nucleating agent.

79. The process of embodiment 59, wherein the composition further comprises one or more additives selected from the group consisting of antioxidants, light stabilizers, fibers, foaming additives, electrically conductive additives, antiblocking agents, antistatic agents, heat stabilizers, impact modifiers, biocides, compatibilizers, tackifiers, colorants, coupling agents, branching agents, curing agents, and pigments.

80. A foam composition, comprising:
a compostable polylactone having the following repeating unit:

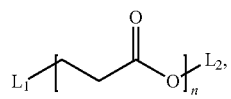

wherein n is from about 4,000 to about 1,000,000, L1 and L2 are independently selected the group consisting of H, alkyl, alkenyl, alkoxy, alkynyl, cycloalkyl, cycloalkenyl and cycloalkynyl, ester, amine, aniline, and amide.

81. The composition of embodiment 80, wherein the compostable polylactone is selected from the group consisting of a polypropiolactone and an end-capped polypropiolactone.

82. The composition of embodiment 81, wherein the polypropiolactone or end-capped polypropiolactone has a molecular weight of between about 40,000 g/mol and about 1,000,000 g/mol.

83. The composition of embodiment 81, wherein the polypropiolactone or end-capped polypropiolactone has a molecular weight of between about 50,000 g/mol about 500,000 g/mol.

84. The composition of embodiment 81, wherein the polypropiolactone or end-capped polypropiolactone has a molecular weight of between about 60,000 g/mol and about 400,000 g/mol.

85. The composition of embodiment 81, wherein the polypropiolactone or end-capped polypropiolactone has a molecular weight of between about 70,000 g/mol about 300,000 g/mol.

86. The composition of embodiment 81, wherein the polypropiolactone or end-capped polypropiolactone has a molecular weight of between about 80,000 g/mol and about 150,000 g/mol.

87. The composition of embodiment 80, wherein the polylactone has greater than about 60% by weight biobased content.

88. The composition of embodiment 80, wherein the polylactone has greater than about 70% by weight biobased content.

89. The composition of embodiment 80, wherein the polylactone has greater than about 80% by weight biobased content.

90. The composition of embodiment 80, wherein the polylactone has greater than about 90% by weight biobased content.

91. The composition of embodiment 80, wherein the polylactone has greater than about 95% by weight biobased content.

92. The composition of embodiment 80, wherein the polylactone has greater than about 99% by weight biobased content.

EXAMPLES

The following Examples are merely illustrative and are not meant to limit any aspects of the present disclosure in any way.

Several acronyms and abbreviations are used throughout this section. For clarity, the most commonly used are presented here: polypropiolactone ("PPL"); beta-propiolactone ("bPL").

Example 1

A dry mix blend of resin is produced consisting of approximately 99% by weight of end-capped polypropiolactone with molecular weight ("MW") from about 80,000 g/mol to about 150,000 g/mol, and approximately 1% by weight of Cereplast ECA-023 talc masterbatch. The dry mix of resin is fed gravimetrically into the feed throat section of a twin-screw extruder (about 11 mm to about 25 mm barrel diameter). The feed rate for the solids is set to 3.5 kg/hr (7.7 lbs/hr), and the screws are rotating at 40 rpm. Carbon dioxide ($CO_2$) is blown into the plastic melt in the fourth barrel section of the extruder at 10 g/min. A single-slit die with a 3 mm opening is bolted to the end of the extruder.

Initially, a flat temperature profile at 110° C. is used. Upon start-up, the extrudate is allowed to reach temperatures higher than 110° C. At the high temperatures, the foaming properties, melt strength, viscosity to hold onto the blowing agent, and cell structure is determined for the extrudate. The temperature profile over the nine barrel sections from feed to exit is systematically adjusted to achieve 10° C., 50° C., 80° C., 110° C., 110° C., 110° C., 110° C., 110° C., and 110° C. across the extruder. At these conditions, the melt pressure at the die is configured to be from about 10 bar to about 15 bar.

Example 2

A dry mix blend of resin is produced consisting of approximately 99% by weight of PPL with MW from about 80,000 g/mol to about 150,000 g/mol, and approximately 1% by weight of Cereplast ECA-023 talc masterbatch. The dry mix of resin is fed gravimetrically into the feed throat section of a twin-screw extruder (about 11 mm to about 25 mm barrel diameter). The feed rate for the solids is set to 3.5 kg/hr (7.7 lbs/hr), and the screws are rotating at 40 rpm. End-capping agents (phosphate, such as trimethylphosphate and triphenylphosphate; benzothiazole; benzoxazole; benzimidazole; 2-aminothiophenol; o-phenylenediamine; and 2-aminophenol) are injected in the third barrel section of the extruder. The amount of end-capped polypropiolactone made in-situ inside the extruder is determined. Carbon dioxide ($CO_2$) is blown into the plastic melt in the fourth barrel section of the extruder at 10 g/min. A single-slit die with a 3 mm opening is bolted to the end of the extruder.

Initially, a flat temperature profile at 110° C. is used. Upon start-up, the extrudate is allowed to reach temperatures higher than 110° C. At this high temperature, the foaming properties, melt strength, viscosity to hold onto the blowing agent, and cell structure are determined for the extrudate. The temperature profile over the nine barrel sections from feed to exit is systematically adjusted to achieve 10° C., 50° C., 80° C., 110° C., 110° C., 110° C., 110° C., 110° C., and 110° C. across the extruder. At these conditions, the melt pressure at the die is from about 10 bar to about 15 bar.

The embodiments described herein are not intended to be limited to the aspects shown, but are to be accorded the widest scope consistent with the principles and features disclosed herein.

What is claimed is:

1. A composition, comprising:
   a. a polylactone polymer being end-capped with a thermally stable compound; and
   b. one or more blowing agents, wherein the composition is foam-able when heated and mixed.

2. The composition of claim 1, wherein the one or more blowing agents includes one or more of water, carbonate salts, carbon-dioxide-releasing materials, diazo compounds, nitrogen-producing materials, carbon dioxide, decomposing polymeric materials, poly(t-butylmethacrylate), polyacrylic acid, nitrogen, pentane, isopentane, cyclopentane, or a combination thereof.

3. The composition of claim 1, further comprising one or more nucleating agents.

4. The composition of claim 3, wherein the one or more nucleating agents includes one or more of talc, kaolin, mica, silica, calcium carbonate, barium sulfate, titanium oxide, aluminum oxide, clay, bentonite, diatomaceous earth, or azodicarbodiamide, or any combination thereof.

5. The composition of claim 1, further comprising one or more additives including one or more of antioxidants, light stabilizers, fibers, foaming additives, electrically conductive additives, antiblocking agents, antistatic agents, heat stabilizers, impact modifiers, biocides, compatibilizers, tackifiers, colorants, coupling agents, curing agents, or pigments, or any combination thereof.

6. The composition of claim 1, further comprising one or more chain extenders or one or more branching agents.

7. The composition of claim 1, wherein the polylactone polymer is polypropiolactone, polylactide, polyglycolide, or polycaprolactone.

8. The composition of claim 1, wherein the polylactone polymer comprises repeating monomers of beta-lactone derivatives.

9. The composition of claim 1, further comprising one or more plasticizers including one or more of polyalkylene glycols, malinated soybean, epoxidized soybean, linseed, sunflower oils, or any combination thereof.

10. The composition of claim 1, wherein when the composition is heated and extruded, the composition is an extrudate having a viscosity and density suitable for forming a stable and durable foam.

11. A foam, comprising:
    a. a polylactone polymer being end capped by a thermally stable compound; and
    b. one or more blowing agents.

12. The foam of claim 11, wherein the one or more blowing agents includes one or more of water, carbonate salts, carbon-dioxide-releasing materials, diazo compounds, nitrogen-producing materials, carbon dioxide, decomposing polymeric materials, poly(t-butylmethacrylate), polyacrylic acid, nitrogen, pentane, isopentane, cyclopentane, or a combination thereof.

13. The foam of claim 12, further comprising one or more nucleating agents.

14. The foam of claim 13, wherein the one or nucleating agents includes one or more of talc, kaolin, mica, silica, calcium carbonate, barium sulfate, titanium oxide, aluminum oxide, clay, bentonite, diatomaceous earth, or any combination thereof.

15. The foam of claim 12, further comprising one or more additives including one or more of antioxidants, light stabilizers, fibers, foaming additives, electrically conductive additives, antiblocking agents, antistatic agents, heat stabilizers, impact modifiers, biocides, compatibilizers, tackifiers, colorants, coupling agents, curing agents, branching agents, chain extenders, plasticizers, pigments, or any combination thereof.

16. The foam of claim 12, wherein the foam has a closed cell structure.

17. The foam of claim 12, wherein the foam is thermolyze-able to produce acrylic acid.

18. A process, comprising:
    heating an end-capped polylactone to produce polylactone melt; and
    processing the polylactone melt to produce a foam.

19. The process of claim 18, wherein prior to heating, the process further comprises combining the end-capped polylactone with one or more nucleating agents, one or more additives, or any combination thereof.

20. The process of claim 18, wherein after heating and prior to molding, the process further comprises adding one or more blowing agents to the polylactone melt.

* * * * *